Patented June 28, 1927.

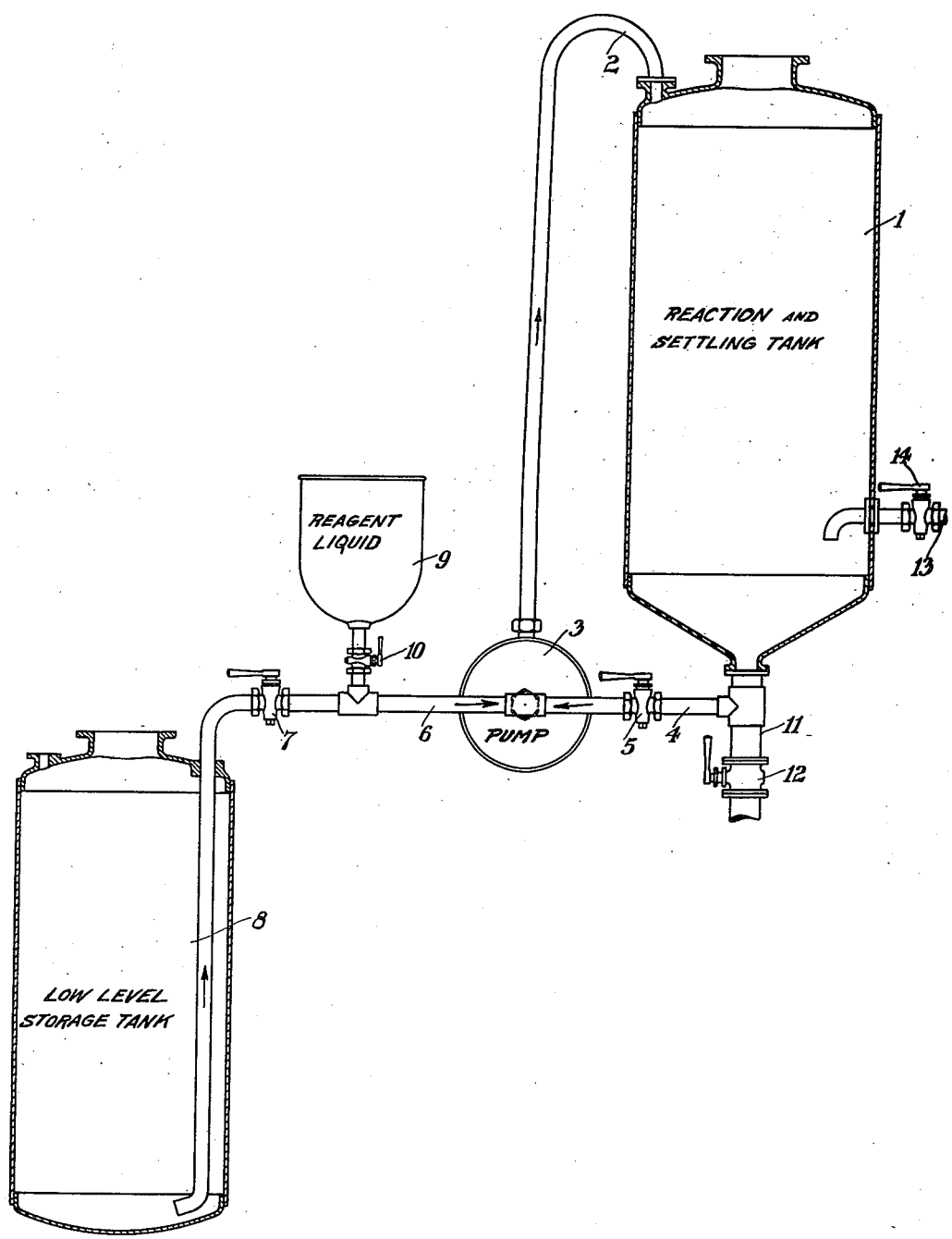

1,633,941

UNITED STATES PATENT OFFICE.

HARRY HEY, OF DEWSBURY, ENGLAND.

PROCESS FOR REMOVING SUSPENDED MATTERS FROM OILS AND ORGANIC SOLVENTS.

Application filed November 26, 1921, Serial No. 517,875, and in Great Britain December 16, 1920.

This invention relates to the removal of suspended matters from oils or solvents containing oils in solution.

The object of the invention is to provide a new precipitating agent and method of using the same for the purpose of removing the very fine suspensions of water and solid matter contained in liquid oils and in volatile organic solvents that have been used in the extraction of oils, greases and waxes from textile materials, bones, seeds and the like, or in volatile organic solvents that have been used in so-called dry cleaning processes.

The suspended matter may consist of water or finely divided portions of materials treated for extraction of oil, or materials treated in cleaning processes or in the case of waste lubricating oils of finely divided portions of the materials and combustion products with which they come into contact when in use. This suspended matter ordinarily settles out very slowly and renders the recovery of clean oils, greases and waxes revivified solvent impossible without resorting to centrifuging or distilling.

According to the present invention the precipitation of impurities is effected by mixing intimately with the impure hot oil or cold solvent, one or a mixture of the following substances:—sulphonated oils; aqueous or alcoholic solutions of sulphonated oils; aqueous or alcoholic solutions of sulphonated oil soaps of potash, soda or ammonia.

The sulphonated oils are produced by the action of strong sulphuric acid on oleic or ricinoleic acid, or their glycerol esters or parent oils such as olive oil, castor oil and the like, either separately or mixed together; also when diluted with hydrocarbon solvents for oils such as petrol, benzol, toluol, xylol, solvent naphtha and the like. The product can be used in the acid state or after washing with brine to remove the excess of free sulphuric acid, or converted into soaps by neutralizing with aqueous or alcoholic alkali solutions.

The surface tension of the finely divided water is lowered and together with the finely divided solid matter, it settles by gravity from the oil or solvent, giving a clear liquid and a sludge containing the foreign matters and the excess of reagent liquid used.

The drawing is a diagrammatic view, partly in section of the apparatus used for carrying out the operation. It consists of a cylindrical reaction and settling tank 1, having an inlet pipe 2 near the top. The lower end of the pipe 2 is attached to the delivery side of a pump 3 for introducing to the tank 1 the liquid to be circulated and treated.

An outlet pipe 4 with valve 5 is fixed near the bottom of the tank 1 and connected to the suction side of the pump 3. Another pipe 6 with a valve 7 is connected to the suction side of the pump 3, for conducting the liquid from a low level storage tank 8 to the upper part of the reaction and settling tank 1. The impure liquid is pumped from the low level storage tank through pipe 6, pump 3 and pipe 2 to the reaction and settling tank 1 and the reagent liquid is introduced into the pipe 6 from a small tank 9 through a valve 10 and carried with the impure liquid into the reagent and settling tank. The two liquids are well mixed together by drawing them off at the bottom of the reaction or settling tank and returning them to the top thereof by means of the pump 3, and then circulating for a few minutes. On stopping the circulation of the mixed liquids, the fine particles of water, solid matter and excess of reagent liquid are slowly precipitated by gravity to the bottom of the reaction tank, leaving a clear supernatant liquid oil or solvent; which is drawn off at a suitable higher level through a draw-off pipe 11 provided with a valve 12, and the precipitated material—in the form of sludge—is removed from the bottom of the tank through a pipe 13 having a valve 14.

It is found that one hundred gallons of hot oil or cold solvent liquid can be clarified by mixing with it one pint of the sulphonated oil or two pints of the aqueous or alcoholic solutions of sulphonated oils or soaps, followed by one hour's settling.

The invention is not confined to these quantities or this stated time, as these can be varied within wide limits, according to the amount of suspended water and solids present, and standard of purification required.

I claim:—

1. The process of reclaiming a used mineral oil or organic solvent containing suspended matter comprising the steps of mixing a sulphonated unsaturated oil intimately with said mineral oil or solvent to be treated and allowing the suspended matter thus precipitated to separate by gravity.

2. The process of reclaiming a used mineral oil or organic solvent containing suspended matter comprising the steps of mixing a solution of sulphonated unsaturated oil intimately with said mineral oil or solvent to be treated and allowing the suspended matter thus precipitated to separate by gravity.

3. The process of reclaiming a used mineral oil or organic solvent containing suspended matter comprising the steps of mixing solutions of sulphonated unsaturated oil and sulphonated oil soap intimately with said mineral oil or solvent to be treated and allowing the suspended matter thus precipitated to separate by gravity.

4. The process of reclaiming a used mineral oil or organic solvent containing suspended matter comprising the steps of mixing aqueous solutions of sulphonated unsaturated oil and sulphonated oil soap intimately with said mineral oil or solvent to be treated and allowing the suspended matter thus precipitated to separate by gravity.

In witness whereof I affix my signature.

HARRY HEY.